UNITED STATES PATENT OFFICE.

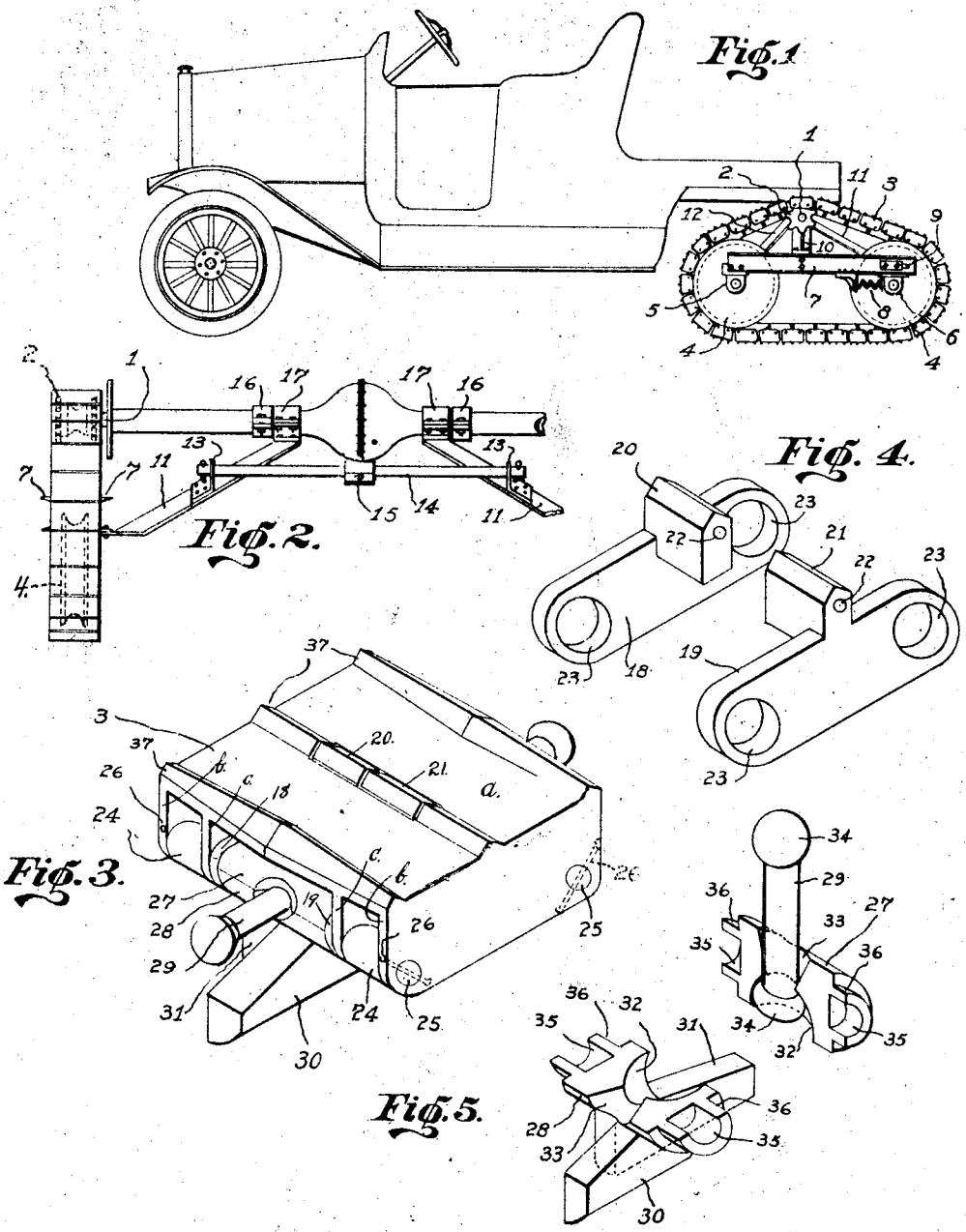

CASSIUS M. WALKER, OF PUEBLO, COLORADO.

CATERPILLAR-TRACTOR.

1,259,938.    Specification of Letters Patent.    Patented Mar. 19, 1918.

Application filed June 5, 1917. Serial No. 172,869.

*To all whom it may concern:*

Be it known that I, CASSIUS M. WALKER, a citizen of the United States, and a resident of Pueblo, in the county of Pueblo and State of Colorado, have invented certain new and useful Improvements in Caterpillar-Tractors, of which the following is a full, clear, and exact description.

My invention is an improvement in caterpillar tractors and it relates to novel means for altering a pleasure or commercial automobile into a caterpillar tractor and also to novel features of construction of the endless chains employed with such tractors. The objects of my invention are the provision of an attachment of the character described which may be readily attached to an automobile without altering the construction of the car, which may be conveniently driven from the rear axle of a pleasure car or from the jack shaft of a truck as occasion may demand, to so design the chain utilized that it will not easily become worn in use and which, even if worn, will nevertheless always fit and ride on the only sprocket wheel provided, and to provide a chain which will readily conform to the shape of the ground to be traversed, whether the same be smooth, rough or lumpy, and will furnish a full bearing surface even if the ground slant in a direction at right angles to the direction of travel. Further and more particular objects and advantages of my invention will later appear from this specification.

In the single sheet of drawings accompanying this application and forming a part hereof—

Figure 1 is a side elevation, partly broken away, showing a pleasure automobile equipped with my invention;

Fig. 2 is a partial rear elevation on an enlarged scale, showing the rear axle and one of the chains of the car illustrated in Fig. 1;

Fig. 3 is a perspective view of one complete link of my chain, as viewed from the tread side, with the connecting pins in position;

Fig. 4 is a perspective view of a pair of side bars, one pair of these bars being employed in each link of my chain; and Fig. 5 is a perspective view showing the two sections of the separable pin sockets, two sets of which are contained in each link of my chain.

Referring to the drawings, in which like characters of reference designate like parts in the several views, the reference numeral 1 indicates the rear axle of an automobile, and 2 a pair of spaced sprockets mounted on each end of said axle. The separate links of the traction chain are indicated by the numeral 3, these links being connected together in a manner later to be described so as to provide a limited universal movement therebetween. The chains run over idlers 4 which bear on the chain and which are journaled in bearings 5, 6 mounted at opposite ends of a pair of longitudinal frame members 7. In order to take up slack which may result from wear or other causes I prefer to make the rear bearing 6 automatically adjustable as indicated, a strong spring 8 being interposed between the bearing 6 and a bracket carried by the members 7, in position to tend always to force the bearing 6 toward the rear of the slot 9 in which it is slidably mounted.

Carried by each pair of members 7 there is a bracket 10 which supports the rear axle of the automobile; and diagonal inclined braces 11, 12 extend from the ends of the inner members 7 to points adjacent the middle of the rear axle casing to which they are joined by split bearings 17 held in place by collars 16 bolted to the casing. In brackets 13 carried by the rear diagonals 11, there is mounted a cross rod 14 on which there is provided a draw bar attachment 15 to which the load to be drawn may be secured.

The preferred chain construction is illustrated in Figs. 3, 4 and 5. Each link is composed of a frame comprising a plate $a$ on its tread side and ribs or flanges $b$, $c$ projecting from said plate on the side opposite the tread, a set of side bars shown in Fig. 4, two sets of socket members shown in Fig. 5 (which are included within the frame between the ribs $c$), and the sprocket wheel engaging members 24 mounted at each side between the ribs $b$ and $c$.

The side bars 18, 19 abut against the inner sides of the ribs $c$ and journal within them the socket members shown in Fig. 5. The bar 18 has a lug 20 projecting laterally and outwardly therefrom and the bar 19 carries a similar lug 21. Through each of these lugs there is a transverse hole 22 provided for a purpose later to be described. Each of the side bars 18 and 19 has circular openings 23 therein at opposite ends thereof in which the socket members shown in Fig. 5 are to be journaled.

As previously stated, there are two full sets of the socket members shown in Fig. 5 employed with each link, these parts comprising an outer section 27 and an inner section 28. The inner section 28 carries a pair of lugs 30, 31 projecting from its inner surface in opposite directions in such position as to interlap with corresponding lugs on the next section 28 to produce what is substantially a continuous rail with a rounded inner surface, each of the lugs having a half rounded inner face for this purpose. The inner and outer sections are also each formed with substantially half spherical sockets 32 and with a half of an elongated recess 33. Each of the inner and outer sections is also formed on each side with a half of a pin journal 35 and with curved outer surfaces 36 adapted, when the sections are joined, to form a hollow shaft which will fit in the bearings 23 provided therefor in the side bars 18, 19. The link pin 29 is provided at each end with spherical heads or enlargements 34 of such size as to be freely received in the sockets formed by the cavities 32 of a pair of superimposed sections 27, 28; and the shanks of these pins 29 will pass freely through the opening formed by two registering recesses 33.

The links may be assembled as follows:— Two sets of the parts shown in Fig. 5 are assembled with their several cavities registering and the pins 29 in place with a head in the sockets 32. Then the side bars 18, 19 are slipped on from opposite sides, the hollow shafts formed by the members 36 being journaled in the openings 23. Then an assembly rivet is passed through the holes 22 and set, thus binding these parts in their true relation. Then the frame portion of the link may be slipped over the previously assembled parts, these parts all fitting between the ribs c, in such relation that the bearings 35 are opposite similar sized bearings in the ribs c (not visible). Four rollers 24 are then inserted in place opposite the bearings 35 and pins 25 are passed through the openings provided therefor in the ribs b, through the rollers 24, the ribs c and into the bearings 35. These pins are then secured in place by riveted locking pins 26 which extend through suitable openings therefor in the ribs b and the pins 25.

For convenience, I have described the assembling of a single link complete in full, thus constructing the element shown in Fig. 3 which has pins 29 projecting from each end. It will of course be understood that the pin ends shown in said figure are those which are received into and coöperate with the adjacent sections 27, 28 of the next links; and that it will be more convenient to first assemble all the socket, pin and side bar elements into a chain and then add all the frame members a subsequently.

In order to give sufficient traction resistance the plates a are provided with ribs 37 and I prefer to make the plate a with an opening in line with the middle of these ribs 37 through which opening the lugs 20, 21 are allowed to project, thus locking the parts more firmly together.

When assembled into a chain and mounted as shown in Fig. 1, the sets of rollers 24 are in position to be engaged by the pair of sprocket wheels 2 to drive the chain; and the overlapped lugs 30, 31 can run in the concave faces of the idlers 4 (shown in Fig. 2) thus making it unnecessary that any particular portion of the chain shall mesh with any portion of the idlers; therefore if the chain becomes lengthened by wear it will still run freely over the idlers.

The spherical sockets 32 and pins 29 permit to each link motion in all directions with relation to the links on either side thereof, thus permitting the chain to accommodate itself to rough surfaces and also to flatly engage surfaces inclined in a direction at right angles to that of travel.

No claim is made in this application to the means shown and described herein for altering an automobile into a caterpillar tractor, as those means are claimed in my copending application Ser. No. 198,004, filed Oct. 23, 1917.

Having thus described my invention, what I claim and desire to secure by Letters Patent is:—

1. A link for a traction chain in combination with a single, longitudinally extending, connecting pin projecting from each end thereof, said pins being joined to the remainder of the link by a ball and socket connection.

2. In a traction chain, a plurality of links, and a single, longitudinally extending pin connecting each pair of links, said pins being joined to said links by ball and socket connections.

3. A link for a traction chain comprising a set of two-part socketed members adjacent each end thereof, in combination with a single, longitudinally extending, connecting pin projecting from each end thereof, said pins being provided at their ends with spherical heads which freely fit in but are retained by said sockets.

4. A link for a traction chain comprising a frame, a set of two-part socketed members mounted in said frame adjacent each end thereof, in combination with a single, longitudinally extending, connecting pin projecting from each end of said link, said pins being provided at their ends with spherical heads which freely fit in but are retained by said sockets.

5. A link for a traction chain comprising a frame, a set of two-part socketed members journaled in said frame adjacent each end thereof, in combination with a single, longitudinally extending, connecting pin projecting from each end of said link, said pins being provided at their ends with spherical heads which freely fit in but are retained by said sockets.

6. A link for a traction chain comprising a frame, a pair of side bars mounted in said frame, a set of two-part socketed members journaled in said side bars, in combination with a single, longitudinally extending, connecting pin projecting from each end of said link, said pins being provided at their ends with spherical heads which freely fit but are retained by said sockets.

7. An element of a link for a traction chain comprising a pair of side bars each having journals at each end and transverse, assembly pin receiving openings therein, a set of two-part socketed members journaled in said side bars at each end thereof, and an assembly pin passed through said assembly pin openings.

8. An element of a link for a traction chain comprising a pair of side bars each having journals at each end and transverse, assembly pin receiving openings therein in registering position, a set of two-part socketed members journaled in said side bars at each end thereof with their sockets facing inward, a spherical headed connecting pin projecting from each end of said link and mounted with their heads in said sockets, and an assembly pin passed through said assembly pin opening.

9. A link for a traction chain consisting of a frame having four longitudinal ribs thereon, a pair of side bars mounted between the inner pair of said ribs, a set of two-part socketed members journaled in said side bars at each end thereof, sprocket wheel engaging rollers mounted at each side of said frame between the outer pairs of ribs, in combination with a single, longitudinally extending, connecting pin projecting from each end of said link, said pins having spherical heads freely mounted in but retained by said sockets.

10. A link for a traction chain consisting of a frame having four longitudinal ribs thereon, a pair of side bars mounted between the inner pair of said ribs, a set of two-part socketed members journaled in said side bars at each end thereof, the shafts of said socketed members being hollow to provide journals, four pins passing through said ribs from the outer side of said links and entering the ends of said hollow shafts, a sprocket wheel engaging roller mounted on each of said pins between the outer pairs of ribs, in combination with a single, longitudinally extending, connecting pins projecting from each end of said link, said pins having spherical heads freely mounted in but retained by said sockets.

11. A link for a traction chain comprising a frame having an outer traction face and longitudinal ribs on its inner face, a set of two-part socketed members mounted in said frame between said ribs at each end of said frame, the inner of said socketed members carrying idler engaging lugs, in combination with a single, longitudinally extending, connecting pin projecting from each end of said link, said pins being provided at their ends with spherical heads which freely fit in but are retained by said sockets.

12. A link for a traction chain comprising a frame having an outer traction face and longitudinal ribs on its inner face, a set of two-part socketed members mounted in said frame between its ribs at each end of said frame, the inner of said socketed members carrying a pair of oppositely extending, staggered lugs adapted to interlap with the lugs of the next adjacent similar member to form idler engaging surfaces for said chain, in combination with a single, longitudinally extending, connecting pin projecting from each end of said link, said pins being provided at their ends with spherical heads which freely fit in but are retained by said sockets.

In testimony whereof I have hereunto affixed my signature.

CASSIUS M. WALKER.